No. 886,158. PATENTED APR. 28, 1908.
G. A. SANTA.
SPLICE BAR.
APPLICATION FILED NOV. 26, 1907.

Inventor
Gust A. Santa.

Witnesses
Joe. P. Wahler,
Hugh H. Ott.

By Victor J. Evans
Attorney

UNITED STATES PATENT OFFICE.

GUST A. SANTA, OF VIRGINIA, MINNESOTA.

SPLICE-BAR.

No. 886,158.　　　Specification of Letters Patent.　　　Patented April 28, 1908.

Application filed November 26, 1907. Serial No. 403,881.

*To all whom it may concern:*

Be it known that I, GUST A. SANTA, a citizen of the United States, residing at Virginia, in the county of St. Louis and State of Minnesota, have invented new and useful Improvements in Splice-Bars, of which the following is a specification.

This invention relates to splice bars and the object of the invention is to provide a device of this character for connecting the meeting ends of rails so as to prevent sinking, spreading or endwise separation of the rails.

To these ends the invention resides in the novel construction of parts and their arrangement in operative combination hereinafter fully described and claimed.

Figure 1:
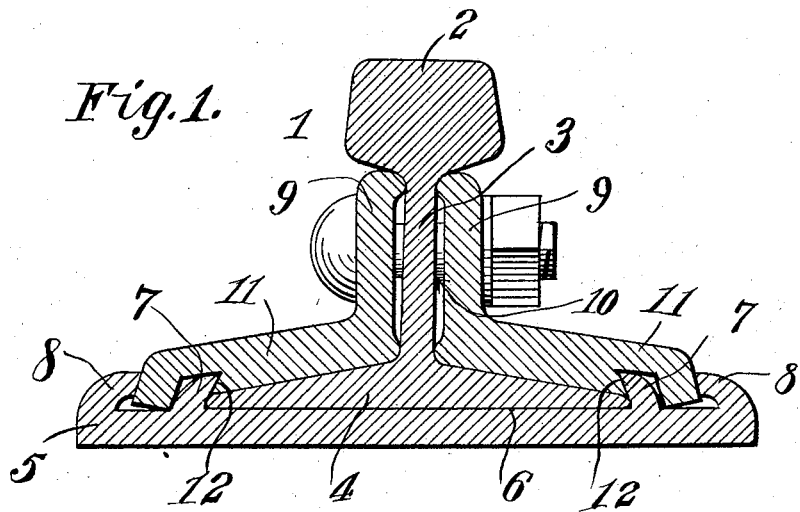
Figure 2:
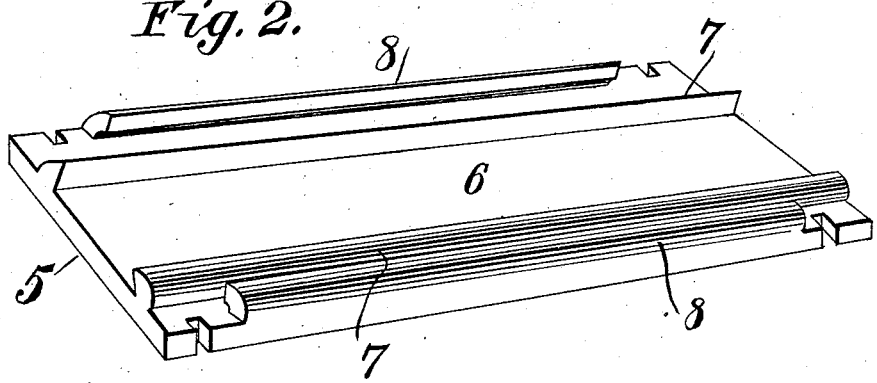
Figure 3:
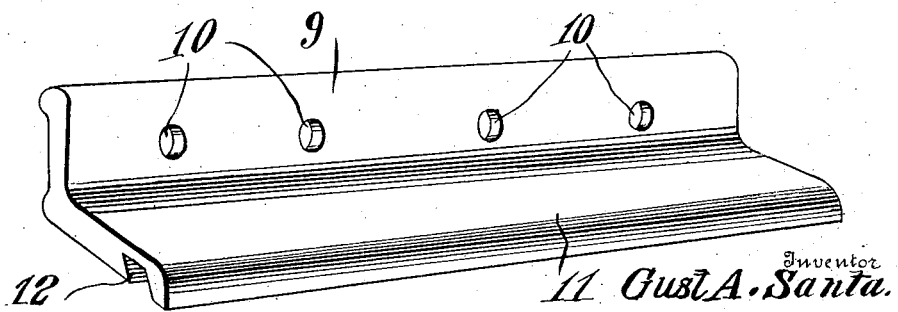

In the drawing, Figure 1 is a cross sectional view of a rail with my invention in position thereon. Fig. 2 is a detail view of the base plate employed in my invention, and Fig. 3 is a perspective view of one of the fish plates.

In the drawing the numeral 1 designates a railway rail of the usual construction having the head 2, web 3 and base flanges 4.

The base plate 5 of my improved splice bar comprises a flat body 6 having a pair of upwardly extending and inwardly inclined ribs 7 spaced apart at a distance equaling that of the base of the rail 1. The outer ends of the base plate 5 are provided with an upwardly extending flange 8 spaced at a suitable distance from the ribs 7 and having their longitudinal ends cut away to provide an even surface upon the base plate 5, and this surface is provided with the vertical slots or grooves for the reception of suitable spikes by which the base plate is secured upon the ties of the rail.

The fish plates employed with my invention are of the usual angle shape having the vertical portion 9, provided with suitable openings 10 for the reception of retaining elements, and with the angular base portion 11, having its under-surface provided near its edge with the longitudinally extending inwardly inclined slot or channel 12. The outer edge of the base portion 11 is also beveled to an angle approximately equal to that of the walls of the channel 12 provided within the under surface of the base portion of the fish plate, and the channel 12 is of a height equaling that of the rib 7 of the base plate 5.

In assembling my improved splice bar the base plate 5 is placed upon the ties of the rail and one of the fish plates placed in position upon the base. The inclined channel 12 of the base portion of the fish plate is inserted upon the ribs 7 of the base plates and the outer beveled end of the fish plate engages with the flange 8 of the base plate. Spikes are then inserted within the slots or grooves provided upon the edges of the base plate to effectively prevent the lateral and longitudinal movement of the base plate and fish plates and to securely retain the plates in locked position with each other. This operation is repeated in placing the other fish plate in position upon the opposite side of the base plate, and the rail is then slid upon the base plate and between the fish plates, the base of the rail occupying a position between the ribs 7 of the base plate. The bolts or retaining elements are now inserted within the openings 10 of the vertical walls of the fish plates and through corresponding openings provided within the web 3 of the rail, and the rail and fish plates effectively secured together.

From the above description it will be seen that I have provided a simple and effective means for preventing the sinking, spreading or endwise separation of the meeting ends of a pair of rails.

While I have described the preferred embodiment of the device, minor details may be resorted to without departing from or sacrificing any of the advantages of my invention.

Having thus fully described the invention what is claimed as new is:

1. A splice bar for rail joints comprising a base plate having longitudinal ribs upon the body portion of the base plate and flanges upon the ends of the base plate, and angle fish plates having a longitudinal channel and an inclined edge, the edge of the fish plate adapted to engage with the flange of the base plate and the longitudinal channel provided within the fish plate adapted to engage upon the ribs of the base plate, and means for preventing longitudinal movement of the fish plates and the base plate.

2. In a splice bar for railway rails, a base plate having ribs, and flanges upon its ends spaced from the ribs, of fish plates having a channel adapted to engage the ribs and beveled edges adapted to engage the flanges of the base plate, and means for preventing longitudinal displacement of the fish plates and the base plate.

3. In combination with the meeting ends of a pair of railway rails, of a base plate having upwardly projecting inwardly inclined ribs engaging the edges of the base of the rail, and having upwardly inclined flanges upon their edges, and a pair of angle fish plates, the vertical walls of the fish plates engaging the web of the rail and the base of the fish plates being provided with longitudinally inclined grooves and a beveled edge, the groove of the fish plates adapted for engagement with the ribs of the base plate and the inclined edges of the fish plates adapted to engage with the inclined flanges of the base plates, means for preventing longitudinal displacement of the fish plates and base plate, and means for securing the fish plates and rail together.

In testimony whereof I affix my signature in presence of two witnesses.

GUST A. SANTA.

Witnesses:
ALBERT E. BICKFORD,
CORA HELSTROM.